(12) United States Patent
Spevak

(10) Patent No.: US 11,249,604 B2
(45) Date of Patent: Feb. 15, 2022

(54) MUTUAL-CAPACITANCE SENSING WITH CONDUCTIVE OVERLAY

(71) Applicant: TEXAS INSTRUMENTS INCORPORATED, Dallas, TX (US)

(72) Inventor: Peter Spevak, Moosburg an der Isar (DE)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

(21) Appl. No.: 16/577,051

(22) Filed: Sep. 20, 2019

(65) Prior Publication Data
US 2021/0089169 A1    Mar. 25, 2021

(51) Int. Cl.
*G06F 3/044* (2006.01)
*G06F 3/041* (2006.01)

(52) U.S. Cl.
CPC .......... *G06F 3/0444* (2019.05); *G06F 3/0416* (2013.01); *G06F 3/0445* (2019.05); *G06F 3/0448* (2019.05); *G06F 2203/04107* (2013.01)

(58) Field of Classification Search
CPC .... G06F 3/0444; G06F 3/0445; G06F 3/0448; G06F 3/0416; G06F 2203/04107
See application file for complete search history.

(56) References Cited

U.S. PATENT DOCUMENTS

| | | | |
|---|---|---|---|
| 2010/0148627 A1* | 6/2010 | Funasaka | G10K 9/122 310/316.01 |
| 2014/0167992 A1* | 6/2014 | Aruga | H01G 4/38 341/143 |
| 2015/0123940 A1* | 5/2015 | Park | G06F 3/04166 345/174 |
| 2015/0317003 A1* | 11/2015 | Pedersen | G06F 3/0416 345/173 |
| 2016/0154507 A1* | 6/2016 | Bharathan | G06F 3/011 345/174 |
| 2016/0299598 A1* | 10/2016 | Yoon | G02F 1/13338 |
| 2017/0220174 A1* | 8/2017 | Kim | G06F 3/0412 |
| 2018/0182822 A1* | 6/2018 | Seo | H01L 27/3248 |
| 2018/0196548 A1* | 7/2018 | Kim | G06F 3/044 |
| 2018/0224966 A1* | 8/2018 | Church | G06F 3/0412 |
| 2019/0227669 A1* | 7/2019 | Maharyta | G06F 3/0448 |

\* cited by examiner

*Primary Examiner* — Premal R Patel
(74) *Attorney, Agent, or Firm* — Charles F. Koch; Charles A. Brill; Frank D. Cimino

(57) ABSTRACT

A device includes an electrical circuit and a mutual-capacitance sensing circuit coupled to the electrical circuit. The mutual-capacitance sensing circuit includes mutual-capacitance sensing electrodes including a transmitter electrode and receiver electrode. The device also includes a conductive overlay over the mutual-capacitance sensing electrodes. The mutual-capacitance sensing circuit is configured to detect deflection of a portion of the conductive overlay relative to the mutual-capacitance sensing electrodes. The receiver electrode has a shape with an inner edge, and the transmitter electrode has a shape with an outer edge that is at least partially surrounded by the inner edge of the receiver electrode.

18 Claims, 4 Drawing Sheets

MUTUAL-CAPACITANCE SENSING WITH CONDUCTIVE OVERLAY

BACKGROUND

Capacitive sensing involves measuring conductivity or dielectric changes. Example capacitive sensing technologies are referred to as surface capacitance and projected capacitance. With projected capacitance sensors, there are two options: self-capacitance sensors and mutual-capacitance sensors. With mutual-capacitance sensors, the charge created on nearby conductive electrodes due to a sense signal is used to measure conductivity or dielectric changes (e.g., presence of a user's finger).

Mutual-capacitance electrodes have been used effectively in scenarios with non-conductive touch overlays. In these scenarios, the proximity of the user's finger changes the dielectric conditions on top of the non-conductive touch overlay in a manner that affects the amount of charge created on the mutual-capacitance electrodes. In scenarios with conductive or metal touch overlays, mutual-capacitance electrodes are exposed to different conditions than in scenarios with non-conductive touch overlays. Existing mutual-capacitance electrodes designed for non-conductive overlays are not optimized for conductive overlay scenarios.

SUMMARY

In accordance with one example of the disclosure, a device comprises an electrical circuit and a controller coupled to the electrical circuit. The device also comprises a mutual-capacitance sensing circuit. The mutual-capacitance sensing circuit comprises mutual-capacitance sensing electrodes including a transmitter electrode and receiver electrode. The device also comprises a conductive overlay over the mutual-capacitance sensing electrodes. The mutual-capacitance sensing circuit is configured to detect deflection of a portion of the conductive overlay relative to the mutual-capacitance sensing electrodes. The receiver electrode has a shape with an inner edge, and the transmitter electrode has a shape with an outer edge that is at least partially surrounded by the inner edge of the receiver electrode.

In accordance with one example of the disclosure, a capacitive sensor system comprises a conductive overlay. The capacitive sensor system also comprises mutual-capacitance sensing electrodes including a transmitter electrode and a receiver electrode spaced from the conductive overlay. The capacitive sensor arrangement also comprises a signal analyzer coupled to the receiver electrode. The signal analyzer is configured to detect deflection of the conductive overlay relative to the mutual-capacitance sensing electrodes.

In accordance with one example of the disclosure, a method comprises deflecting a portion of a conductive overlay. The method also comprises detecting the deflecting using mutual-capacitance sensing electrodes including a planar transmitter electrode within a planar receiver electrode. The method also comprises performing a circuit-based operation based on detecting deflection of the portion of the conductive overlay.

BRIEF DESCRIPTION OF THE DRAWINGS

For a detailed description of various examples, reference will now be made to the accompanying drawings in which.

DETAILED DESCRIPTION

Figure 1:
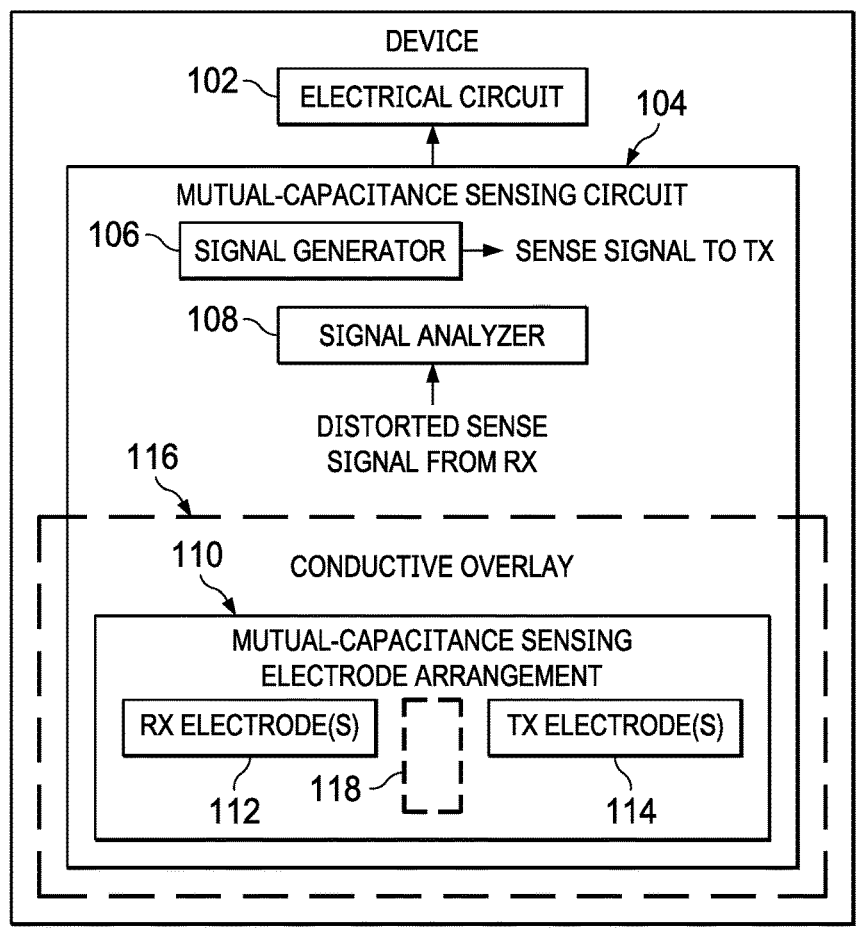
FIG. 1 is a block diagram showing a device in accordance with some examples.

Disclosed herein are mutual-capacitance sensing with conductive overlay options. The disclosed mutual-capacitance sensing options involve mutual-capacitance electrodes including a transmitter electrode and receiver electrode spaced from each other. The mutual-capacitance electrodes are part of a mutual-capacitance sensing circuit that includes a signal generator coupled to the transmitter electrode and a signal analyzer coupled to the receiver electrode. To perform mutual-capacitance sensing, the signal generator applies a sense signal to the transmitter electrode. The charge at the transmitter electrode due to the sense signal results in charge at the receiver electrode such that a distorted version of the sense signal at the receiver electrode is available for analysis. In accordance with the disclosed examples, the conductive overlay is positioned relative to the mutual-capacitance electrodes, such that when a portion of the conductive overlay is deflected (e.g., by a user or machine applying pressure perpendicular to the portion of the conductive overlay) the distorted version of the sense signal is modified based on the deflection (the charge at the receiver electrode resulting from the sense signal being applied to the transmitter electrode is affected by deflection of the portion of the conductive overlay relative to a default position). Thus, the sense signal is distorted as a function of deflection of the portion of the conductive overlay. In some examples, the mutual-capacitance sensing circuit is configured to detect the occurrence of deflections at the portion of the conductive overlay. In other examples, the mutual-capacitance sensing circuit is configured to detect the amount of deflection at the portion of the conductive overlay.

Regardless of whether occurrence or the amount of deflection at the portion of the conductive overlay is being determined, different analysis options for sense signal distortion analysis are possible. In some examples, the peak of the distorted sense signal at the receiver electrode is used to indicate occurrence or the amount of deflection at the portion of the conductive overlay. In other examples, the rise time or rising slope of the distorted sense signal at the receiver electrode is used to indicate occurrence or the amount of deflection at the portion of the conductive overlay. In other examples, the fall time or falling slope of the distorted sense signal at the receiver electrode is used to indicate occurrence or the amount of deflection at the portion of the conductive overlay. In some examples, deflection detection involves monitoring the result of applying the sense signal over a time interval that includes multiple sense signal pulses (an accumulation of the effects of deflection is used to enhance the sensitivity). In one example, an accumulated charge transferred to a sensing capacitor is the final result of the effects of deflection. Accordingly, the amount of accumulated charge after a certain number of periods of the sense signal, or the number of sense signal periods needed to reach a certain threshold charge is used to detect deflection.

In one example, the sense signal is transmitted as one or more square pulses, and the distorted sense signal corresponds to one or more distorted pulses at the receiver electrode resulting from the sense signal being applied at the transmitter electrode. When the portion of the conductive overlay is deflected, the distorted sense signal is smaller than it would otherwise be if the portion of the conductive overlay were not deflected. Thus, the amount of charge corresponding to the distorted sense signal can be an indicator of the occurrence and/or the amount of deflection at the portion of the conductive overlay. In some examples, a capacitor, a sample-and-hold circuit, and/or other components are used to analyze the amount of charge relative to predetermined thresholds in order to determine the occurrence and/or the amount of deflection at the portion of the conductive overlay. Also, in some examples, the mutual-capacitance sensing circuit accounts for the conductive overlay being ungrounded by use of a grounded conductive layer between the mutual-capacitance electrodes and the conductive overlay, where the grounded conductive layer is mechanically coupled to the conductive overlay while being electrically-isolated from the conductive overlay and the mutual-capacitance electrodes.

In the disclosed mutual-capacitance sensing scenarios involving a conductive overlay, a mutual-capacitance electrode arrangement that improves sensitivity (compared to other mutual-capacitance electrode arrangements such as those developed for non-conductive overlay scenarios) is presented. More specifically, positioning the transmitter electrode within the receiver electrode is beneficial for detecting the occurrence or the amount of deflection at the portion of the conductive overlay being monitored. In one example, the receiver electrode is a ring shape electrode and the transmitter electrode is a solid circle electrode within the receiver electrode. While a concentric solid shape for the transmitter electrode relative to the receiver electrode has been determined to provide suitable sensitivity in a conductive overlay scenario, other shapes for the transmitter electrode and the receiver electrode are possible (e.g., square or rectangular electrodes, where the transmitter electrode is within the receiver electrode). Also, while centering the transmitter electrode within the receiver electrode is a suitable arrangement, mutual-capacitance sensing is possible without such centering. Also, it should be understood that mutual-capacitance electrodes with the transmitter electrode within the receiver electrode is a preference rather than a requirement for mutual-capacitance sensing in a conductive overlay scenario. To provide a better understanding, various mutual-capacitance sensing examples involving a conductive overlay are described using the figures as follows.

FIG. 1 is a block diagram showing a device 100 in accordance with some examples. The device 100 corresponds to an electrical device with controllable features (e.g., a graphic user interface, on/off operation, actuator adjustment operation), where control of a given feature is based on deflection detection of a conductive overlay using mutual-capacitance sensing as described herein. In different examples, the device 100 is a hand-held smart phone, a tablet computer, an actuator or motor-based tool, and/or another device with controllable features based on deflection detection of a conductive overlay using mutual-capacitance sensing as described herein. Accordingly, in the example of FIG. 1, the device 100 comprises an electrical circuit 102 configured to perform any of a variety of functions for the device 100. Examples of the electrical circuit 102 include an on/off circuit, an actuator modulation circuit (e.g., to adjust motor speed, actuator position, and/or other actuator parameters), a user interface control circuit (e.g., volume control, display brightness control, keyboard strokes, and/or other user interface options), computer components (e.g., a processor coupled to memory and peripheral components, etc.).

As shown, the electrical circuit 102 is coupled to a mutual-capacitance sensing circuit 104. The mutual-capacitance sensing circuit 104 includes a signal generator 106 and a signal analyzer 108 coupled to a mutual-capacitance sensing electrode arrangement 110 having receiver electrode(s) 112 and transmitter electrode(s) 114. More specifically, the signal generator 106 is configured to provide a sense signal to the transmitter electrode(s) 114. In response, the signal analyzer is configured to receive a distorted sense signal from the receiver electrode(s) 112.

As represented in the example of FIG. 1, the device 100 also includes a conductive overlay or surface 116 that covers at least the mutual-capacitance sensing electrode arrangement 110. In some examples, the conductive overlay or surface 116 only covers some of the mutual-capacitance sensing electrode arrangement 110. In such examples, deflection detection sensitivity is reduced, but could still be sufficient to perform control operations based on deflection detection. In operation, the mutual-capacitance sensing circuit 104 is configured to determine when a monitored portion 118 of the conductive overlay 116 is deflected (e.g., by a user or machine applying pressure perpendicular to the portion 118 of the conductive overlay 116). In the example of FIG. 1, the monitored portion 118 of the conductive overlay 116 is represented as being between the transmitter electrode(s) 114 and the receiver electrode(s) 112. In reality, the monitored portion 118 is offset from (e.g., above) all of transmitter electrode(s) 114 and the receiver electrode(s) 112. However, when the monitored portion 118 is deflected, the charge created on the transmitter electrode(s) 114 and the receiver electrode(s) 112 due to the sense signal is affected. Thus, the sense signal is distorted as a function of deflection of the monitored portion 118 of the conductive overlay 116. The deflection-based distortion of a sense signal at the receiver electrode(s) 112 (relative to a default sense signal distortion when no deflection of the monitored portion 118 occurs) can be analyzed to determine when deflection of the monitored portion 118 has occurred and/or the amount of deflection.

In some examples, the monitored portion 118 of the conductive overlay 116 corresponds to a flat surface that covers all of the mutual-capacitance sensing electrode arrangement 110 such that the average default offset (when there is no deflection) between the monitored portion 118 and the transmitter electrode(s) 114 is the same as the average default offset between the monitored portion 118 and the receiver electrode(s) 112. In other examples, the monitored portion 118 of the conductive overlay 116 is uneven and/or only covers some of the mutual-capacitance sensing electrode arrangement 110 such that the average default offset (when there is no deflection) between the monitored portion 118 and the transmitter electrode(s) 114 is not the same as the average default offset between the monitored portion 118 and the receiver electrode(s) 112. Regardless of whether the average default offset between the monitored portion 118 and the transmitter electrode(s) 114 is the same or not as the average default offset between the monitored portion 118 and the receiver electrode(s) 112, deflection of the monitored portion 118 may result in an average deflection-based offset between the monitored portion 118 and the transmitter electrode(s) 114 being different than the average deflection-based offset between the monitored portion 118 and the receiver electrode(s) 112. Regardless of variations in such average default offsets and/or average deflection-based offsets, deflection detection is still possible (the variations can be ignored while still achieving deflection detection, or strategically adjusted to enhance deflection detection sensitivity).

In some examples, deflection of the monitored portion 118 decreases the amount of charge created on the receiver electrode(s) 112 due to the sense signal being applied to the transmitter electrode(s) 114 (relative to no deflection of the monitored portion 118). This is the case, for example, when the conductive overlay 116 is grounded. In such examples, a decrease in the amount of charge created on the receiver electrodes(s) 112 due to a sense signal (relative to the amount of charge created on the receiver electrode(s) 112 due to the sense signal when no deflection occurs) is an indicator of deflection of the monitored portion 118. Thus, the sense signal is distorted as a function of deflection of the monitored portion 118 of the conductive overlay 116. As desired, multiple thresholds related to the amount of charge created on the receiver electrode(s) 112 due to a sense signal can be used to determine different levels of deflections. In such case, the response of the electrical circuit 102 may vary depending according to the different levels of deflection.

In some examples, the conductive overlay 116 is not grounded and there are no conductive or capacitive coupling elements for any other electric potentials relative to the electric potentials used for deflection detection based on mutual-capacitance sensing as described herein. In this rare scenario, even if the conductive overlay 116 is floating, a user touch to deflect the monitored portion 118 of the conductive overlay 116 would create a capacitive or conductive connection to earth ground. Thus, there is usually some capacitive coupling to application potentials including its ground (GND) in the mutual-capacitance sensing scenarios described herein. In addition to the electric potential of the conductive overlay 116 being affected by touch (e.g., a user touch or machine-based touch) different electric potentials (direct current (DC) or alternating current (AC)) could be applied to the conductive overlay 116. Depending on the amplitude and frequency of the different electric potentials, some interference with the mutual-capacitance sensing operations described herein is possible.

In some examples, due to these possible sources of interference and their effect on the mutual-capacitance sensing results, if the conductive overlay is floating against the application GND (or carrying other electric potentials), an additional conductive layer (not shown) between the conductive overlay 116 and the transmitter electrode(s) 114 and receiver electrode(s) 112 may be used. In such case, the additional conductive layer is: 1) mechanically coupled to the conductive overlay 116 such that deflection of the monitored portion 118 of the conductive overlay 116 results in deflection of the additional conductive layer; 2) electrically isolated from the conductive overlay 116 and from the transmitter electrode(s) 114 and receiver electrode(s) 112; and 3) tied to application GND. In this example, the mutual-capacitance sensing operations detect deflection of the additional conductive layer, which can be interpreted as deflection of the conductive overlay 116 (due to mechanical coupling of the conductive overlay 116 and the additional conductive layer).

Figure 2:
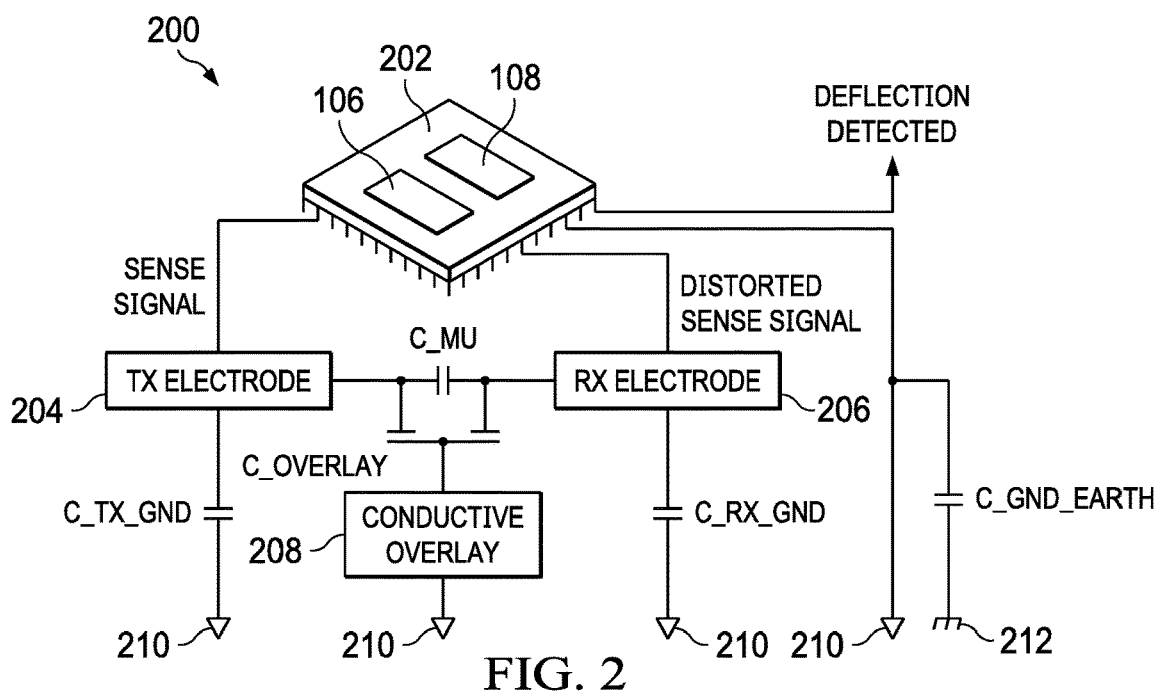
FIG. 2 is a diagram showing a mutual-capacitance sensing circuit in accordance with some examples.

FIG. 2 is a diagram showing a mutual-capacitance sensing circuit 200 (an example of the mutual-capacitance sensing circuit 104 in FIG. 1) in accordance with some examples. In the example of FIG. 2, the mutual-capacitance sensing circuit 200 includes a controller 202 (e.g., an integrated circuit (IC) or chip) with the signal generator 106 and the signal analyzer 108 described in FIG. 1. The mutual-capacitance sensing circuit 200 also includes a transmitter electrode 204 (an example of the transmitter electrode(s) 114 in FIG. 1), a receiver electrode 206 (an example of the receiver electrode(s) 112 in FIG. 1), and a conductive overlay 208 (an example of the conductive overlay 116 in FIG. 1). In FIG. 2, the transmitter electrode 204 and the receiver electrode 206 are used as mutual-capacitance sensing electrodes.

In FIG. 2, various capacitances are represented, including a mutual capacitance (C_MU) between the transmitter electrode 204 and the receiver electrode 206. Another represented capacitance includes a transmitter-to-ground capacitance (C_TX_GND) between the transmitter electrode 204 and a circuit ground node 210 for the mutual-capacitance sensing circuit 200. Another represented capacitance includes a receiver-to-ground capacitance (C_RX_GND) between the transmitter electrode 204 and the circuit ground node 210 for the mutual-capacitance sensing circuit 200. Another represented capacitance includes a conductive overlay capacitance (C_OVERLAY) between the conductive overlay 208 and the electrodes 204 and 206. Another represented capacitance includes an application ground to earth ground capacitance (C_GND_EARTH) between the circuit ground node 210 and an earth ground 212. In the example of FIG. 2, the voltage level of the conductive overlay 208 is at the same voltage level as the circuit ground node 210 for the mutual-capacitance sensing circuit 200.

In other examples, the conductive overlay 208 is floating or is otherwise at a different voltage level relative to the voltage level of the circuit ground node 210 for the mutual-capacitance sensing circuit 200. In such case, the mutual-capacitance sensing circuit 200 includes an additional conductive layer (not shown). If an additional conductive layer is used, it should be: 1) mechanically coupled to the conductive overlay such that deflection of the conductive overlay results in deflection of the additional conductive layer; 2) electrically isolated from the conductive overlay 208, the transmitter electrode 204, and the receiver electrode 206 (using insulative layers as needed between the additional conductive layer and the conductive overlay 208, the transmitter electrode 204, and the receiver electrode 206); and 3) tied to the circuit ground node 210. In the example of FIG. 2, the additional conductive layer would replace the conductive overlay 208 and C_OVERLAY would be interpreted as the capacitance between the additional conductive layer and the electrodes 204 and 206.

In operation, the signal generator 106 periodically outputs a sense signal to the transmitter electrode 204. The sense signal applied to the transmitter electrode 204 creates a charge at the receiver electrode 206, resulting in a distorted version of the sense signal at the receiver electrode 206. The distortion to the sense signal at the receiver electrode 206 is a function of C_MU, whose value varies depending on deflection of a monitored portion of the conductive overlay 208. The distortion to the sense signal is also a function of C_TX_GND and C_RX_GND, and C_OVERLAY. Regardless of how C_MU, C_TX_GND, C_RX_GND, and C_OVERLAY is changed in presence of deflection of the monitored portion of the conductive overlay 208, the signal analyzer 108 of the controller 202 is configured to analyze the distorted sense signal (e.g., one or more pulses) to detect or measure at least one distortion parameter of the distorted sense signal that is associated with deflection of the monitored portion of the conductive overlay 208. In some examples, the at least one distortion parameter can be determined by analyzing the distorted sense signal without deflection to determine one or more default distortion parameters. Once the default distortion parameters are known, the distorted sense signal due to deflection of the monitored portion of the conductive overlay 208 is analyzed. Differences between the default distortion parameters and deflection-based distortion parameters (distortion due to deflection of the conductive overlay) are then identified and used later to detect deflection. In response to detecting deflection (or a threshold amount of deflection) of the monitored portion of the conductive overlay 208, the signal analyzer 108 asserts a deflection detected signal to an electrical circuit (e.g., the electrical circuit 102 of FIG. 1).

Figure 3:
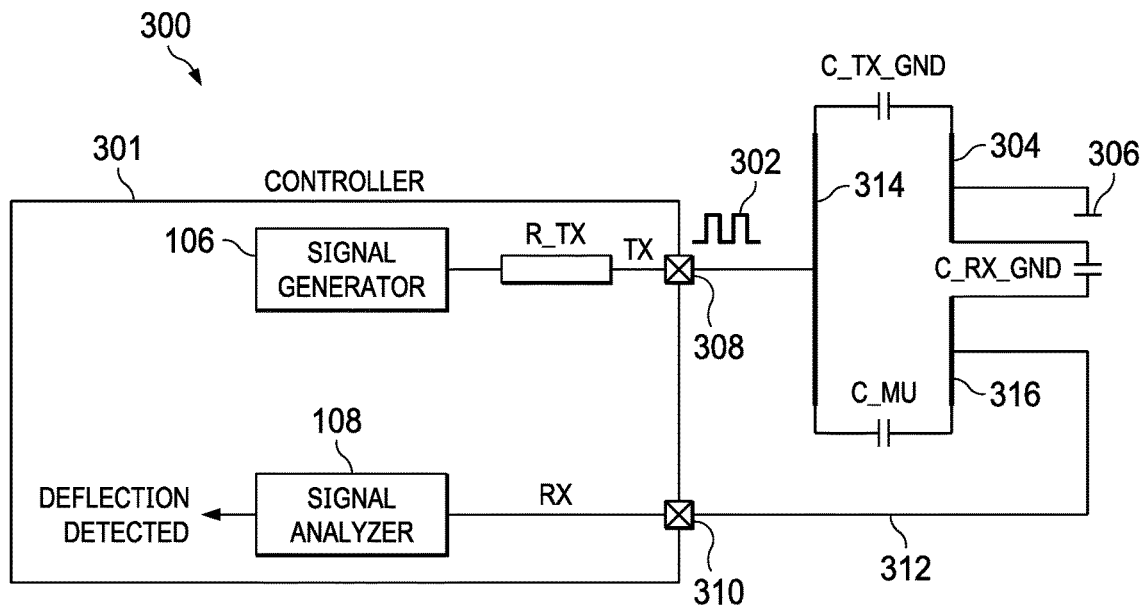
FIG. 3 is another diagram showing a mutual-capacitance sensing circuit in accordance with some examples.

FIG. 3 is another diagram showing a mutual-capacitance sensing circuit 300 (an example of the mutual-capacitance sensing circuit 104 in FIG. 1, or the mutual-capacitance sensing circuit 200 in FIG. 2) in accordance with some examples. As shown, the mutual-capacitance sensing circuit 300 includes a controller 301 (an example of the controller 202 in FIG. 2) with the signal generator 106 and the signal analyzer 108. In the example of FIG. 3, the controller 301 represents an IC or chip with a first pin or node 308 to couple the signal generator 106 to components external to the controller 301, and a second pin or node 310 to couple the signal analyzer 108 to components external to the controller 301. As shown, a transmission link resistance (R_TX) is represented between the signal generator 106 and the node 308.

The node 308 is coupled to a transmitter electrode 314 (an example of the transmitter electrode(s) 114 in FIG. 1, or the transmitter electrode 204 in FIG. 2). In operation, the signal generator 106 outputs a sense signal 302 to the transmitter electrode 314 via R_TX and the node 308, where R_TX is the serial resistance in the path of the sense signal 302. R_TX contributes positively to the sensitivity of the setup, as a higher capacitance at the node 308 will cause a bigger voltage drop at R_TX, which can be interpreted as the output resistance of the signal generator 106. The sense signal 302 applied to the transmitter electrode 314 creates charge at the receiver electrode 316 (an example of the receiver electrode(s) 112 in FIG. 1, or the receiver electrode 206 in FIG. 2), resulting in a distorted sense signal at the receiver electrode 316. In other words, the transmitter electrode 314 and the receiver electrode 316 are used as mutual-capacitance sensing electrodes in the example of FIG. 3.

As described previously, the distorted sense signal at a receiver electrode, such as the receiver electrode 316, is a function of C_MU, C_TX_GND, and C_RX GND (discussed with regard to FIG. 2). In the representation of FIG. 3, a conductive surface 304 is represented as being coupled to a ground node 306 for the mutual-capacitance sensing circuit 300. In some examples, the conductive surface 304 corresponds to a conductive overlay. In other examples, the conductive surface 304 corresponds to an additional conductive layer that is: 1) mechanically coupled to a conductive overlay such that deflection of the conductive overlay results in deflection of the additional conductive layer; 2) electrically isolated from the conductive overlay, the transmitter electrode 314, and the receiver electrode 316; and 3) tied to the circuit ground node 210 for the mutual-capacitance sensing circuit 300.

Regardless of the whether the conductive surface 304 is a conductive overlay or additional conductive layer, its deflection will affect the charge created at the receiver electrode 316 in response to a sense signal applied at the transmitter electrode 314. Because the conductive surface 304 is grounded, deflection of the conductive surface towards the transmitter electrode 314 and/or the receiver electrode 316 during sensing operations (e.g., application of a sense signal to the transmitter electrode 314) results in less charge at the receiver electrode 316. To summarize, the distorted sense signal 312 at the receiver electrode 316 is a function of the sense signal 302, C_MU, C_TX_GND, and C_RX_GND. In the example of FIG. 3, the signal analyzer 108 is configured to detect or measure a distortion parameter of the distorted sense signal 312 that is associated with deflection of the conductive surface 304. In response to detecting deflection (or a threshold amount of deflection) of the conductive surface 304, the signal analyzer 108 asserts a deflection detected signal to an electrical circuit (e.g., the electrical circuit 102 of FIG. 1), which enables the electrical circuit to perform a circuit-based operation (e.g., a graphical user interface (GUI) operation, on/off operation, actuator adjustment operation).

Figure 4:
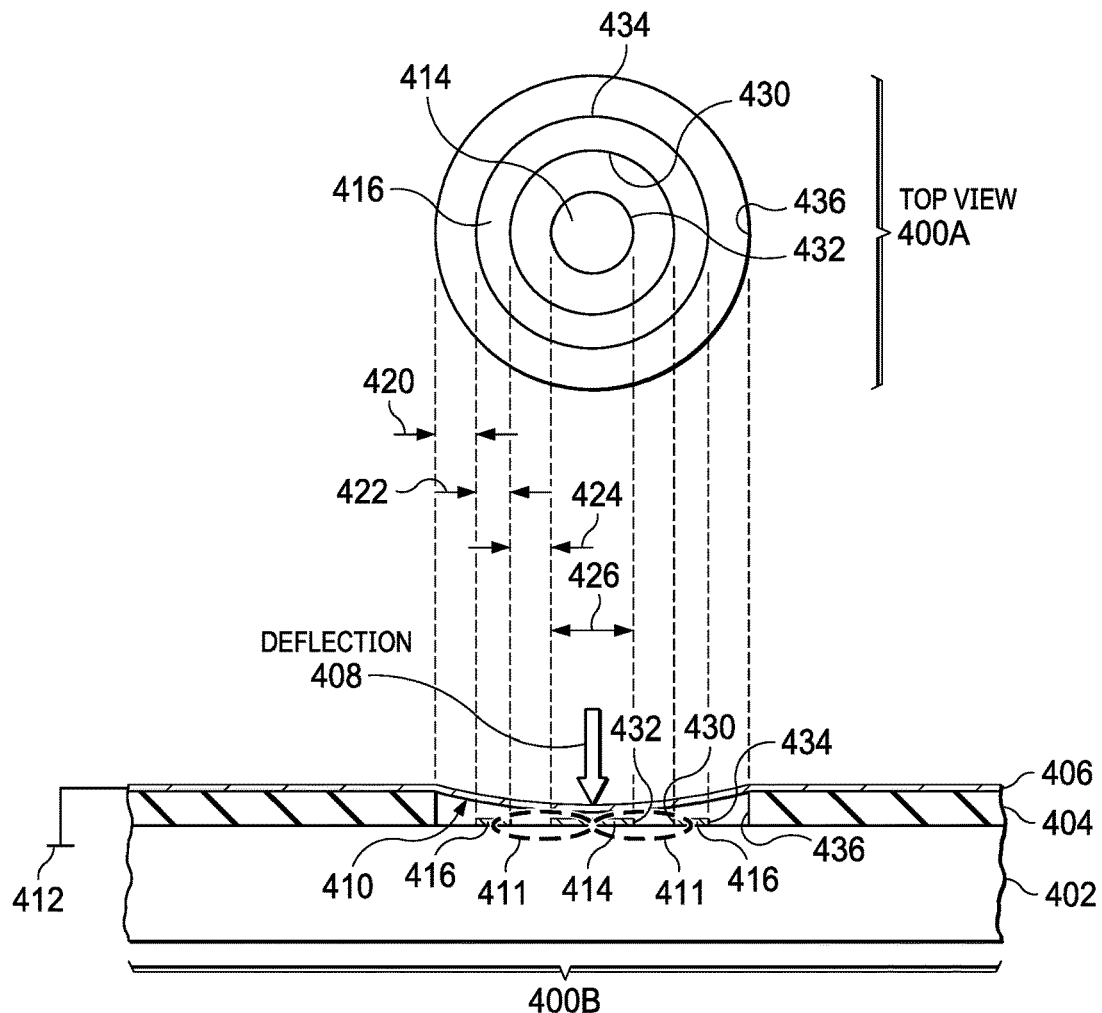
FIG. 4 is a top view and a cross-sectional view showing mutual-capacitance electrodes in conductive overlay scenario in accordance with some examples.

FIG. 4 is a top view 400A and a cross-sectional view 400B showing mutual-capacitance sensing electrodes in a conductive overlay scenario in accordance with some examples. In FIG. 4, the mutual-capacitance sensing electrodes include a planar transmitter electrode 414 (an example of the transmitter electrode(s) 114 in FIG. 1, the transmitter electrode 204 in FIG. 2, or the transmitter electrode 314 in FIG. 3) and a planar receiver electrode 416 (an example of the receiver electrode(s) 112 in FIG. 1, the receiver electrode 206 in FIG. 2, or the receiver electrode 316 in FIG. 3).

In the example of FIG. 4, the planar receiver electrode 416 has a shape that includes an inner edge 430. Also, the planar transmitter electrode 414 has a shape that includes an outer edge 432 that is at least partially surrounded by the inner edge 430 of the planar receiver electrode 416. As represented in the top view 400A, the outer edge 434 of the planar transmitter electrode 414 in FIG. 4 is fully within the inner edge 430 of the planar receiver electrode 416. More specifically, in the example of FIG. 4, the planar receiver electrode 416 is a ring shape electrode with inner edge 430 and the planar transmitter electrode 414 is a solid circle shape electrode with outer edge 432, where the outer edge 432 of the solid circle shape of the planar transmitter electrode 414 is fully surrounded by the inner edge 430 of the ring shape of the planar receiver electrode 416. In other examples, the planar transmitter electrode 414 is a ring shape electrode rather than a sold circle shape electrode. Also, in other examples, the entirety of the outer edge 432 of the planar transmitter electrode 414 is not fully within the inner edge 430 of the planar receiver electrode 416. In such examples, the outer edge 432 of the planar transmitter electrode 414 is still partially cradled by or surrounded by the inner edge 430 of the planar receiver electrode 416. As an example, the planar transmitter electrode 414 could have a half-circle shape, and the planar transmitter electrode 414 could have a half-ring shape. In such examples, an outer edge 432 of the planar transmitter electrode 414 is partially surrounded by the inner edge 430 of the planar receiver electrode 416.

Also, in different examples, the ring width 422 of the planar receiver electrode 416 varies. For example, the ring width 422 of the planar receiver electrode 416 could be some percentage (e.g., 5%, 10%, 20%, 30%, etc.) larger than or smaller than the radius of the planar transmitter electrode 414. Also, in different examples, the spacing 424 between the planar transmitter electrode 414 and the planar receiver electrode 416 varies. For example, the spacing 424 could be some percentage (e.g., 5%, 10%, 20%, 30%, etc.) larger than or smaller than the ring width 422 of the planar receiver electrode 416.

Also, in the example of FIG. 4, the spacing 424 between the inner edge 430 of the planar receiver electrode 416 and the outer edge 432 of the planar transmitter electrode 414 is uniform. In other examples, the spacing 424 between the inner edge 430 of the planar receiver electrode 416 and the outer edge 432 of the planar transmitter electrode 414 is not uniform. Also, in different examples, the diameter 426 of the planar transmitter electrode 414 varies. For example, the radius (half of diameter 426) of the planar transmitter electrode 414 could be some percentage (e.g., 5%, 10%, 20%, 30%, etc.) larger than or smaller than the ring width 422 of the planar receiver electrode 416. Also, in different examples, the inner diameter of the planar receiver electrode 416 varies. For example, the inner diameter of the planar receiver electrode 416 could be some percentage larger (e.g., 100%, 110%, 120%, 130%, etc.) than the diameter 426 of the planar transmitter electrode 414. Also, in different examples, the spacing 420 between the planar receiver electrode 416 and the spacer material 404 varies. For example, the spacing 420 could be some percentage (e.g., 100%, 110%, 120%, 130%, etc.) larger than the ring width 422 of the planar receiver electrode 416. In the example of FIG. 4, the spacing 420 between the outer edge 434 of the planar receiver electrode 416 and the inner edge 436 of the spacer material 404 is uniform. In other examples, the spacing 420 between the outer edge 434 of the planar receiver electrode 416 and the inner edge 436 of the spacer material 404 is not uniform.

In some examples, one or more of the planar transmitter electrode 414 and the planar receiver electrode 416 has another shape (e.g., a square shape, a rectangular shape, or other shapes). Also, in some examples, one transmitter electrode and a plurality of receiver electrodes are used. In other examples, a plurality of transmitter electrodes and one receiver electrode are used. In other examples, a plurality of transmitter electrodes and a plurality of receiver electrodes are used. The quantity and arrangement of transmitter electrode(s) and receiver electrode(s) may vary depending on application, monitoring portion size, desired sensitivity and/or other factors.

In the example of FIG. 4 and as represented in the cross-sectional view 400B, the planar transmitter electrode 414 and the planar receiver electrode 416 are on the surface of the printed circuit board (PCB) 402. In this manner, coupling the planar transmitter electrode 414 to a signal generator 106, and coupling the planar receiver electrode 416 to a signal analyzer is facilitated. Also, the planar transmitter electrode 414 and the planar receiver electrode 416 are spaced from a conductive overlay 406 by a spacer material 404. In some examples, an average gap (e.g., represented by the spacing 424) between the planar transmitter electrode 414 and the planar receiver electrode 416 is within one order of magnitude of an average gap (e.g., represented by the width of the spacer material 404) between the mutual-capacitance sensing electrodes (the planar transmitter electrode 414 or the planar receiver electrode 416) and the conductive overlay 406.

In the example of FIG. 4, the conductive overlay 406 is coupled to a ground node 412, which corresponds to a circuit ground node for a mutual-capacitance sensing circuit. In another example, the conductive overlay 406 is not grounded. In this other example, an additional conductive layer (not shown) is used underneath the conductive overlay 406, where the additional conductive layer is: 1) mechanically coupled to the conductive overlay 406 such that deflection 408 of the conductive overlay 406 results in deflection of the additional conductive layer; 2) electrically isolated from the conductive overlay 406, the planar transmitter electrode 414, and the planar receiver electrode 416; and 3) tied to a ground node for the mutual-capacitance sensing circuit.

A description of mutual-capacitance sensing follows, where the conductive overlay 406 is assumed to be grounded to the circuit ground for the mutual-capacitance sensing circuit. If the conductive overlay 406 were to ungrounded or otherwise at a voltage level different than the circuit ground for the mutual-capacitance sensing circuit, the discussion would be updated to refer to an additional conductive layer as described herein. As represented in FIG. 4, deflection 408 of a monitored portion 410 of the conductive overlay 406 results in the average distance or offset between the conductive overlay 406 and the planar transmitter electrode 414 being reduced relative to an average default offset (e.g., the width of the spacer material 404) when no deflection is occurring. Also, the average offset between the monitored portion 410 of the conductive overlay 406 and the planar receiver electrode 416 is reduced relative to an average default offset (e.g., the width of the spacer material 404) when no deflection is occurring. As represented in FIG. 4, if deflection 408 of the conductive overlay 406 results in a concave shape for the monitored portion 410 of the conductive overlay 406, the average offset between the conductive overlay 406 and the planar transmitter electrode 2064B is smaller than the average offset between the conductive overlay 406 and the planar receiver electrode 416.

In FIG. 4, the deflection 408 of the monitored portion 410 results in a concave upper surface and a convex lower surface for the monitored portion 410 of the conductive overlay 406. In different examples, the shape of the monitored portion 410 when deflected may vary from what is represented in FIG. 4 (e.g., depending on flexibility or malleability of the monitored portion 410 and the sharpness or bluntness of the source of deflection). Regardless of the particular shape of the monitored portion 410 when deflected, the change in average offset between the conductive overlay 406 and the planar transmitter electrode 414 relative to an average default offset (e.g., with no deflection) affects the active regions 411 between the planar transmitter electrode 414, the planar receiver electrode 416, and the conductive overlay 406 and changes the charge created at the planar receiver electrode 416 in response to a sense signal applied to the planar transmitter electrode 414. Thus, when the planar transmitter electrode 414 receives a sense signal from a signal generator (e.g., the signal generator 106 in FIGS. 1-3) while the monitored portion 410 of the conductive overlay 406 is in a deflected state, the distorted sense signal created at the planar receiver electrode 416 is altered relative a default distorted sense signal when there is no deflection of the monitored portion 410 of the conductive overlay 406. As described herein, a controller (e.g., the controller 202 in FIG. 2, or the controller 301 in FIG. 3) is able to detect or quantify distortion parameters due to deflection 408 of the monitored portion 410 of the conductive overlay 406. In this manner, the occurrence or amount of deflection 408 is detected, and used to provide a deflection detected signal as described herein.

Figure 5:
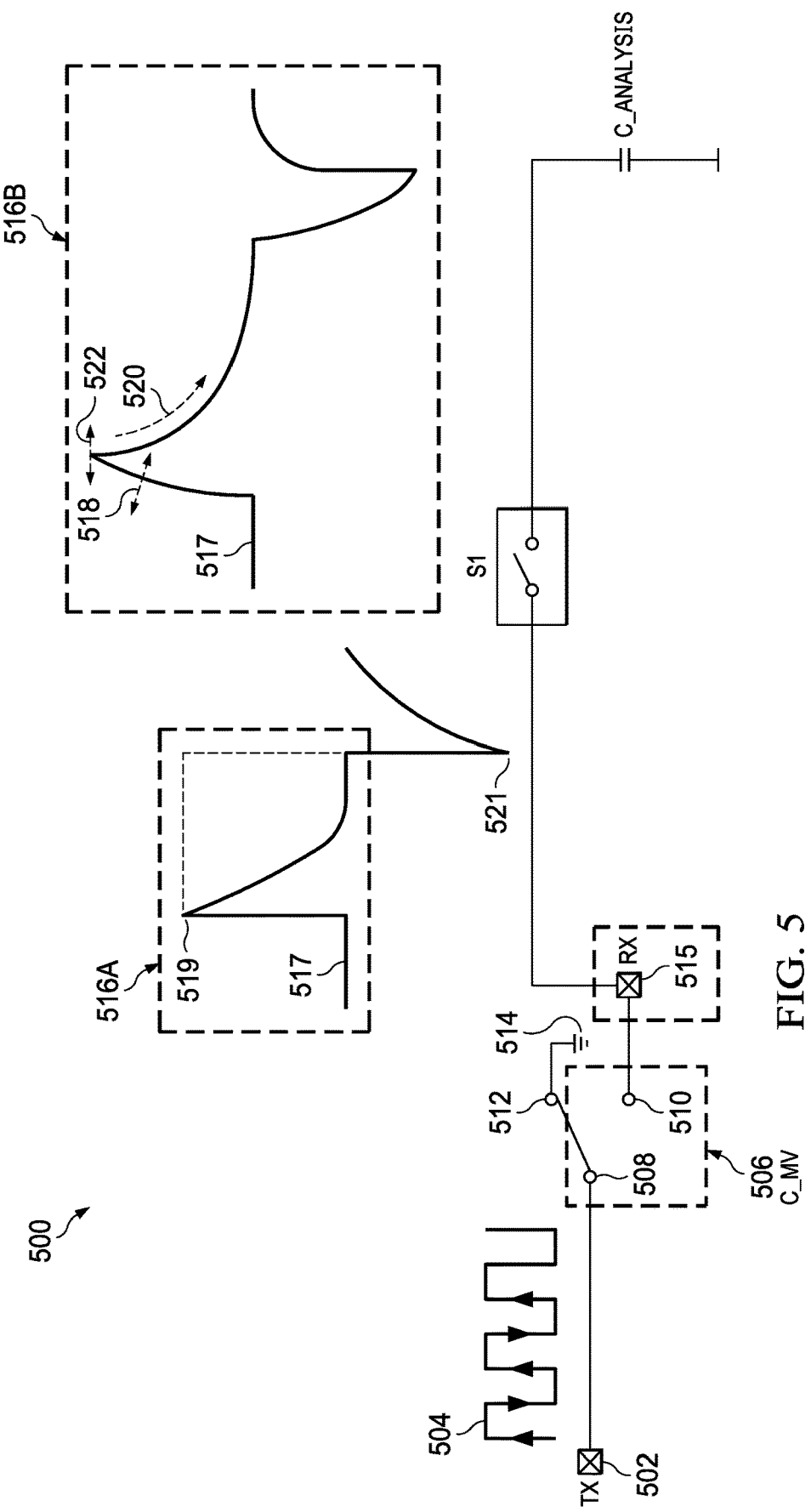
FIG. 5 is a diagram showing mutual-capacitance sensing operations in accordance with some examples.

FIG. 5 is a diagram 500 showing mutual-capacitance sensing operations in accordance with some examples. In the diagram 500, a transmit node 502 (an example of the node 308 in FIG. 3) is represented as conveying a sense signal 504 to a mutual-capacitance sensing electrode arrangement 506 (an example of the mutual-capacitance sensing electrode arrangement 110 in FIG. 1) having a transmitter electrode 508 (an example of the transmitter electrode(s) 114 in FIG. 1, the transmitter electrode 204 in FIG. 2, the transmitter electrode 314 in FIG. 3, or the planar transmitter electrode 414 in FIG. 4). The mutual-capacitance sensing electrode arrangement 506 also includes a receiver electrode 510 (an example of the receiver electrode(s) 112 in FIG. 1, the receiver electrode 206 in FIG. 2, the receiver electrode 316 in FIG. 3, or the planar receiver electrode 416 in FIG. 4). The mutual-capacitance sensing electrode arrangement 506 also includes a conductive surface electrode 512 (an example of the monitored portion 118 of the conductive overlay 116 in FIG. 1, the conductive surface 304 in FIG. 3, the monitored portion 410 of the conductive overlay 406 in FIG. 4, or the additional conductive surface described herein). When the conductive surface electrode 512 is deflected, the charge at the receiver electrode 510 due to the sense signal 504 is changed relative to a default charge that is created when no deflection is occurring. The change in charge at the receiver electrode 510 is detectable by analysis of the distorted sense signal 517 at a receive node 515 (an example of the node 310).

Graphs 516A and 516B show an example of a distorted sense signal 517 due to the sense signal 504 and deflection of the conductive surface electrode 512. In graph 516A, the distorted sense signal 517 has a positive peak 519 and a negative peak 521. In some examples, as represented in graph 516B, distortion parameters 518, 520, and/or 522 are used to detect deflection of the conductive surface electrode 512. The distortion parameter 518 represents a change in the rise time or the rising slope of the positive peak 519 of the distorted sense signal 517. The distortion parameter 520 represents a change in the fall time or the falling slope of the positive peak 519 of the distorted sense signal 517. The distortion parameter 522 represents a change in the peak magnitude of the positive peak 519 of the distorted sense signal 517. In other examples, other distortion parameters may be used.

In the example of FIG. 5, the distorted sense signal 517 is used to charge a capacitor (C_ANALYSIS). To charge C_ANALYSIS, a switch 51 is used to sample-and-hold the charge resulting from at least part of the distorted sense signal 517. In some examples, if the conductive surface electrode 512 is grounded to a circuit ground node 514 and the charge stored by C_ANALYSIS in response to a sense signal is less than a threshold, then a deflection detected signal is asserted. In other examples, multiple thresholds are used (e.g., the amount of charge associated with deflection detected is between two thresholds). In some examples, the sense signal 504 is a square pulse or other pulsed waveform with a frequency in the range of 1-3 MHz. Use of other frequencies for the sense signal 504 is possible. Also, C_MU may have a range of 1-10 pF. Other C_MU values are possible. When deflection of a monitored portion of a conductive surface occurs, the changes in C_MU may be in the range of femtofarads. In other examples, the changes in C_MU due to deflection vary. Regardless, these changes to C_MU are detectable and are used to detect deflection of a conductive overlay as described herein.

Figure 6:
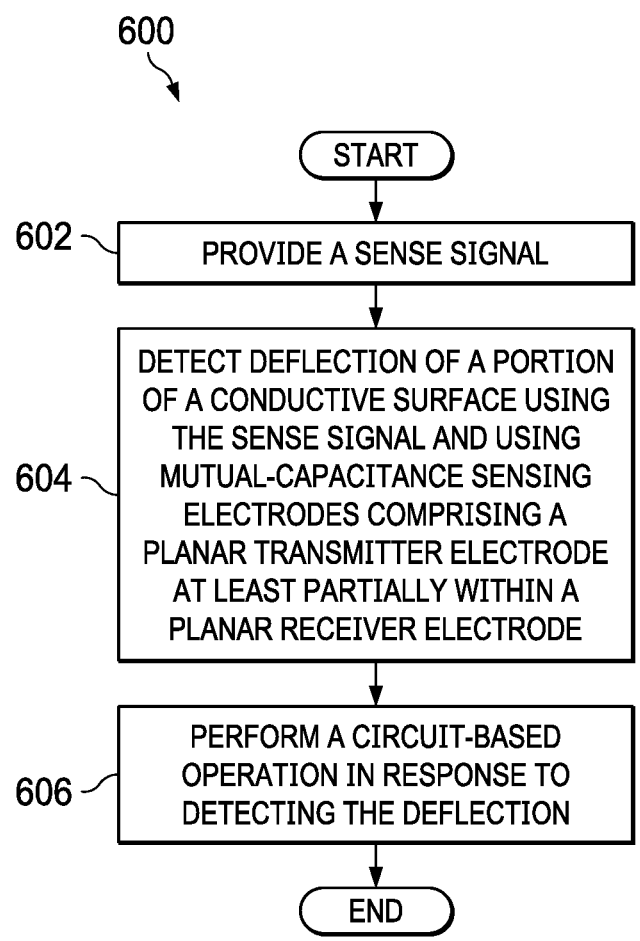
FIG. 6 is a flowchart showing a mutual-capacitance sensing method in accordance with some examples.

FIG. 6 is a flowchart showing a mutual-capacitance sensing method 600 in accordance with some examples. The method 600 is performed, for example, by the device 100 in FIG. 1. As shown, the method 600 includes providing a sense signal at block 602. At block 604, the method 600 includes detecting a deflection of a portion of a conductive surface using the sense signal and using mutual-capacitance sensing electrodes including a planar transmitter electrode within a planar receiver electrode. At block 606, the method 600 includes performing a circuit-based operation in response to detecting deflection of the conductive overlay at block 604.

In some examples, the operations of block 604 involve transmitting a sense signal to the planar transmitter electrode and receiving a distorted version of the sense signal at the planar receiver electrode. The operations of block 604 also may involve comparing a parameter of the distorted version of the sense signal with at least one threshold, wherein the parameter varies as a function of said deflecting. In different examples, a peak parameter, a rising time/edge parameter, and/or a falling time/edge parameter is used to detect occurrence or amount of deflection. The operations of block 604 also may involve asserting a deflection detected signal based on said comparing.

Modifications are possible in the described embodiments, and other embodiments are possible, within the scope of the claims.

What is claimed is:

1. A device, comprising:
   a transmitter electrode having a transmitter electrode outer edge, wherein the transmitter electrode comprises a solid circle shape electrode; and
   a receiver electrode having a receiver electrode inner edge and a receiver electrode outer edge, wherein the receiver electrode inner edge surrounds the transmitter electrode outer edge;
   a conductive overlay over the transmitter electrode and the receiver electrode; and
   a conductive layer between the transmitter electrode and the conductive overlay.

2. The device of claim 1, wherein the receiver electrode comprises a ring shape electrode, and wherein the transmitter electrode is within the ring shape electrode.

3. The device of claim 1, wherein an average gap between the transmitter electrode and the receiver electrode is within one order of magnitude of an average gap between the transmitter electrode and the conductive overlay.

4. The device of claim 1, further comprising a controller configured to instruct the transmitter electrode to transmit a sense signal to the receiver electrode, wherein the receiver electrode is configured to receive a distortion of the sense signal and transmit the distortion of the sense signal to the controller.

5. The device of claim 4, wherein the controller is further configured to determine a deflection amount based on the distortion of the sense signal.

6. The device of claim 5, further comprising an electrical circuit coupled to the transmitter electrode and to the receiver electrode, wherein the controller is configured to assert a deflection detected signal to the electrical circuit in response to determining the deflection amount is greater than a threshold.

7. The device of claim 1, wherein the conductive overlay is grounded.

8. The device of claim 1, wherein the conductive layer is mechanically coupled to the conductive overlay, the conductive layer electrically isolated from the conductive overlay, the transmitter electrode, and the receiver electrode, and the conductive layer electrically coupled to a ground terminal.

9. The device of claim 8, further comprising an insulative layer between the conductive overlay and the conductive layer.

10. A system, comprising:

a conductive overlay;

a transmitter electrode having a transmitter electrode outer edge, wherein the transmitter electrode comprises a solid circle shape electrode;

a receiver electrode having a receiver electrode inner edge and a receiver electrode outer edge, wherein the receiver electrode inner edge surrounds the transmitter electrode outer edge;

a capacitor coupled to the receiver electrode; and a controller coupled to the receiver electrode and to the transmitter electrode, wherein the controller is configured to detect deflection of the conductive overlay relative to the transmitter electrode and the receive electrode.

11. The system of claim 10, wherein the receiver electrode comprises a ring shape electrode.

12. The system of claim 10, wherein an average gap between the transmitter electrode and the receiver electrode is within one order of magnitude of an average gap between the transmitter electrode and the conductive overlay.

13. The system of claim 12, wherein the controller is configured to:

transmit a sense signal to the transmitter electrode;

receive a distorted sense signal; and detect at least one distortion parameter of the conductive overlay responsive to the distorted sense signal and the sense signal.

14. The system of claim 13, wherein the controller is further configured to determine a deflection level for at least a portion of the conductive overlay based on the distorted sense signal.

15. The system of claim 10, wherein the conductive overlay is coupled to a ground terminal.

16. The system of claim 10, further comprising a conductive layer that mechanically coupled to the conductive overlay, the conductive layer electrically isolated from the conductive overlay, the transmitter electrode, and the receiver electrode, and the conductive layer electrically coupled to a ground terminal.

17. A method, comprising:

transmitting, by a controller, a sense signal having a peak;

receiving, by the controller, a distorted sense signal having a distorted peak;

charging a capacitor with the distorted sense signal;

determining, by the controller, a conductive surface deflection, based on the peak and the distorted peak; and activating a conductive surface deflection signal in response to determining the distorted sense signal stored on the capacitor is less than a threshold when a conductive surface electrode is grounded to a circuit ground node.

18. The method of claim 17, wherein determining the conductive surface deflection is performed based on a rise time of the distorted peak, a rising slope of the distorted peak, a fall time of the distorted peak, a falling slope of the distorted peak, or a magnitude of the peak.

* * * * *